US012209456B2

(12) United States Patent
Maug et al.

(10) Patent No.: US 12,209,456 B2
(45) Date of Patent: Jan. 28, 2025

(54) JAMB FOR LOADING DOCK DOOR AND SYSTEM INCLUDING SAME

(71) Applicant: Pitt-Ohio Express LLC, Pittsburgh, PA (US)

(72) Inventors: James A. Maug, Sewickley, PA (US); James P. Fields, Rochester Hills, MI (US)

(73) Assignee: Pitt-Ohio Express LLC, Pittsburgh, PA (US)

( * ) Notice: Subject to any disclaimer, the term of this patent is extended or adjusted under 35 U.S.C. 154(b) by 308 days.

(21) Appl. No.: 17/496,406

(22) Filed: Oct. 7, 2021

(65) Prior Publication Data

US 2022/0120134 A1 Apr. 21, 2022

Related U.S. Application Data

(60) Provisional application No. 63/088,910, filed on Oct. 7, 2020.

(51) Int. Cl.
*E06B 9/58* (2006.01)

(52) U.S. Cl.
CPC .................................... *E06B 9/58* (2013.01)

(58) Field of Classification Search
CPC ...... E06B 9/58; E06B 9/581; E06B 2009/587; E06B 2009/802; E06B 2009/805; E06B 2009/581
See application file for complete search history.

(56) References Cited

U.S. PATENT DOCUMENTS

| | | | | |
|---|---|---|---|---|
| 3,341,973 A * | 9/1967 | Miller | E06B 9/52 | 49/420 |
| 4,930,563 A * | 6/1990 | Finch | E06B 9/58 | 160/133 |
| 5,131,450 A * | 7/1992 | Lichy | E04H 4/101 | 160/310 |
| 5,601,134 A * | 2/1997 | Pinkalla | E06B 9/86 | 160/271 |
| 5,927,368 A * | 7/1999 | Rohrer | E05D 15/165 | 160/201 |
| 6,021,837 A * | 2/2000 | Miller | E06B 9/174 | 160/133 |

(Continued)

FOREIGN PATENT DOCUMENTS

| | | | | |
|---|---|---|---|---|
| AU | 2015101228 A4 | 10/2015 | | |
| EP | 3112235 A1 * | 1/2017 | | B61B 1/02 |
| KR | 20160110030 A * | 9/2016 | | |

OTHER PUBLICATIONS

English translation of KR 20160110030 (Year: 2016).*

(Continued)

*Primary Examiner* — Johnnie A. Shablack
(74) *Attorney, Agent, or Firm* — K&L Gates LLP

(57) ABSTRACT

An improved loading dock door system is disclosed herein. The loading dock door system can include a first jamb and a second jamb positioned opposite the first jamb. The loading dock door system can further include a first top rail partially surrounding the first jamb, a second top rail partially surrounding the second jamb, a first door stop removably connected to the first top rail, and a second door stop removably connected to the second top rail. The first and second jambs can include a polymer and are configured to receive a loading dock door.

22 Claims, 6 Drawing Sheets

(56) References Cited

U.S. PATENT DOCUMENTS

| | | | | |
|---|---|---|---|---|
| 6,041,846 | A * | 3/2000 | Langlois | E06B 3/486 160/229.1 |
| 6,065,525 | A * | 5/2000 | Wells | E06B 9/58 160/273.1 |
| 6,095,229 | A | 8/2000 | Kellogg et al. | |
| 6,715,531 | B2 * | 4/2004 | Simon | E06B 9/581 160/84.06 |
| 7,533,501 | B2 * | 5/2009 | Neal | E06B 1/36 52/208 |
| 7,748,431 | B2 * | 7/2010 | Jansen | E06B 9/13 160/264 |
| 8,109,317 | B2 * | 2/2012 | Bostyn | E06B 9/581 160/271 |
| 8,113,265 | B2 * | 2/2012 | Hardison, III | E06B 9/13 160/44 |
| 8,333,229 | B2 * | 12/2012 | Kimener | E06B 9/58 160/242 |
| 8,439,101 | B2 * | 5/2013 | Kimener | E05D 11/0009 160/266 |
| 8,490,669 | B2 | 7/2013 | Fletcher et al. | |
| 8,607,842 | B2 * | 12/2013 | Drifka | E06B 9/13 160/266 |
| 8,919,056 | B2 * | 12/2014 | Rochman | E06B 1/34 52/211 |
| 9,238,934 | B2 * | 1/2016 | Booi | E06B 1/342 |
| 9,279,287 | B2 * | 3/2016 | Balay | E06B 9/58 |
| 9,371,689 | B2 * | 6/2016 | Licciardi Di Stefano | E06B 9/581 |
| 9,637,972 | B2 * | 5/2017 | Miller | E06B 9/88 |
| 10,501,984 | B2 * | 12/2019 | Balay | E06B 9/17046 |
| 11,028,639 | B2 * | 6/2021 | Ouyang | E06B 9/13 |
| 2003/0079845 | A1 | 5/2003 | Stern | |
| 2007/0131358 | A1 * | 6/2007 | Iwasaki | E06B 9/80 160/133 |
| 2007/0277943 | A1 * | 12/2007 | Boerger | E06B 9/581 160/273.1 |
| 2013/0306252 | A1 * | 11/2013 | Lambridis | E06B 9/582 160/133 |
| 2014/0102035 | A1 * | 4/2014 | Rochman | E06B 1/342 52/717.01 |
| 2017/0067285 | A1 * | 3/2017 | Lambridis | E06B 9/581 |
| 2020/0392785 | A1 * | 12/2020 | Bennett | E06B 9/80 |
| 2021/0148163 | A1 * | 5/2021 | Errington | E06B 9/86 |

OTHER PUBLICATIONS

International Search Report and Written Opinion for International PCT Application No. PCT/US2021/054045, dated Feb. 1, 2022.

International Preliminary Report on Patentability for International PCT Application No. PCT/US2021/054045, dated Apr. 20, 2023.

Thomson et al., Recycling of High-Density Polyethylene (HOPE or PEHD) (Feb. 18, 2020), www.azocleantech.com/article.aspx?Article1D=2 55>.

Trimiok, EPDM Rubber Seals (Sep. 26, 2020), www.trimlok.eom/rubber-extrusion/epdm-seal.

* cited by examiner

JAMB FOR LOADING DOCK DOOR AND SYSTEM INCLUDING SAME

CROSS-REFERENCE TO RELATED APPLICATION

This application claims the benefit under 35 U.S.C. § 119 (e) of the earlier filing date of U.S. Provisional Patent Application No. 63/088,910 filed on Oct. 7, 2020, titled JAMB FOR LOADING DOCK DOOR AND SYSTEM INCLUDING SAME, the contents of which are hereby incorporated by reference in their entirety.

BACKGROUND

This application discloses an invention which is related, generally and in various aspects, to a jamb for a loading dock door and a system including the jamb.

Jambs for loading dock doors are subjected to a number of impact events, most often from forklifts or the pallets/materials being carried by the forklifts. Current jambs typically comprise a metal material, and the impact events serve to scratch, dent, and otherwise deform the jambs. Sometimes after many impact events and at other times after only a single impact event, a jamb is damaged to the point where the level of damage causes the integrity of the door, the integrity of the components of the door and/or the operation of the door to be negatively affected. When a jamb becomes damaged to a certain point, the damaged jamb is typically removed and replaced with a new jamb. The replacement of a damaged jamb with a new jamb currently occurs more often than desired.

When a jamb is replaced, costs associated with the replacement jamb and the labor to install the replacement jamb are incurred. In addition, the bay associated with the replacement jamb is rendered unavailable for use. Thus, there is also an opportunity cost incurred with the replacement of the jamb.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
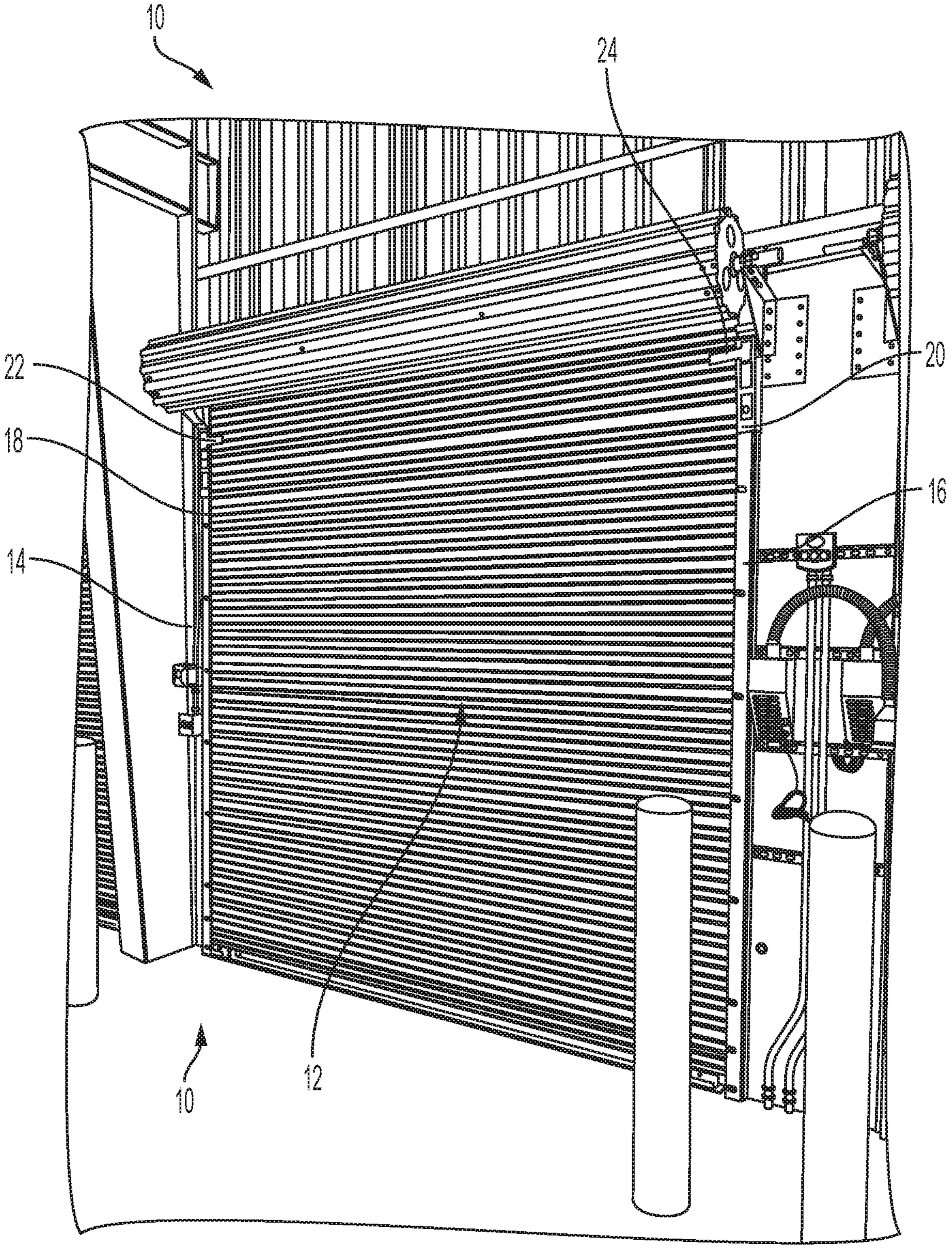
FIG. 1 illustrates a perspective view of a loading dock door system, in accordance with at least one aspect of the present disclosure.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the jamb and loading dock door system in detail, it should be noted that the various aspects disclosed herein are not limited in their application or use to the details of construction and arrangement of parts illustrated in the accompanying drawings and description. Rather, the disclosed aspects may be positioned or incorporated in other aspects, variations and modifications thereof, and may be practiced or carried out in various ways. Accordingly, aspects of the jamb and loading dock door system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as outward, inward, above and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 2:
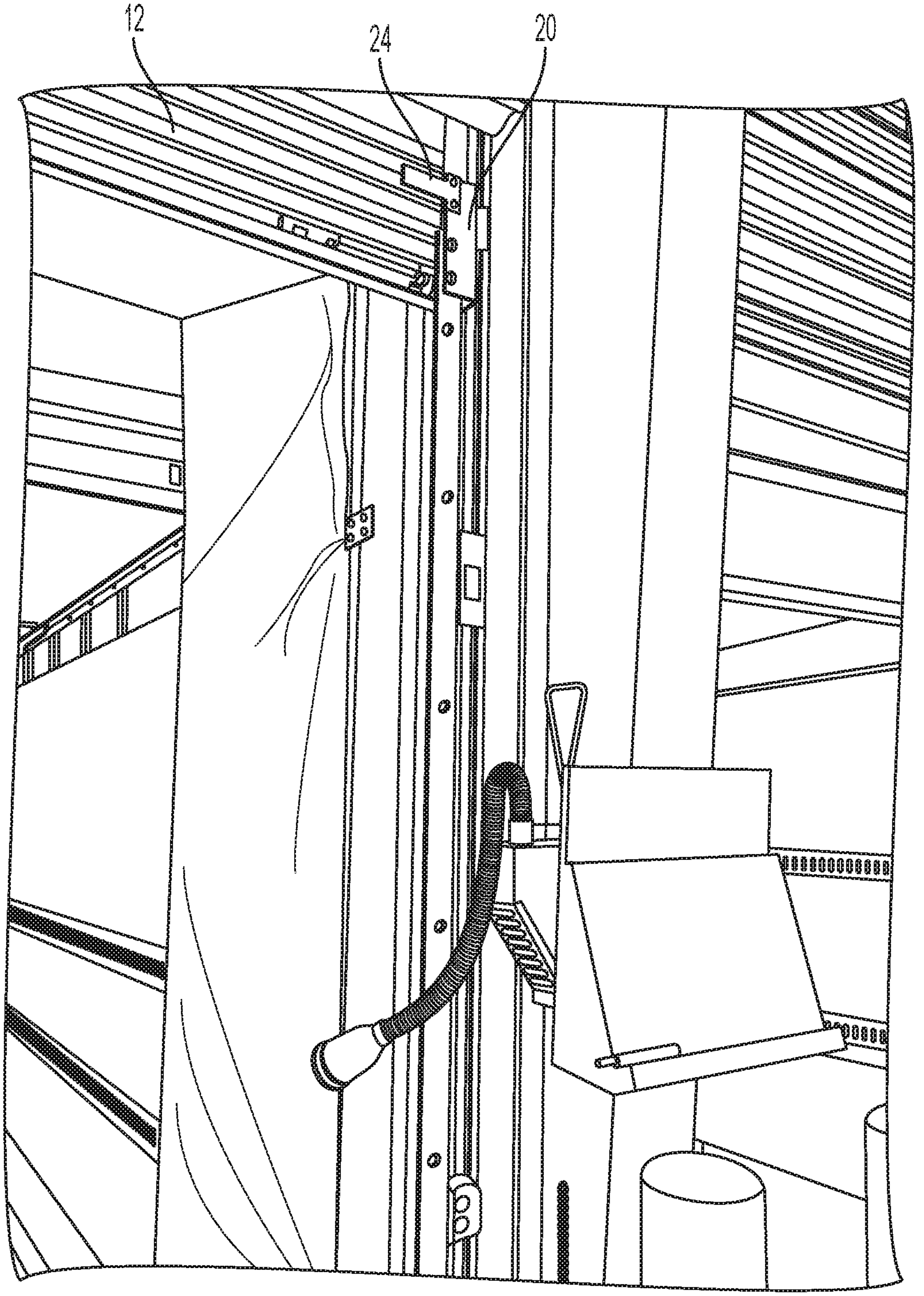
FIG. 2 illustrates another perspective view of the loading dock door system of FIG. 1, in accordance with at least one aspect of the present disclosure.

FIGS. 1 and 2 illustrate perspective views of a loading dock door system 10, in accordance with at least one aspect of the present disclosure. The loading dock door system 10 includes a loading dock door 12, a first jamb 14, a second jamb 16, a first top rail 18, a second top rail 20, a first door stop 22 and a second door stop 24. As described in more detail hereinbelow, the first top rail 18 defines a first door guide 26 (See FIG. 3) and the second top rail 20 defines a second door guide 28. The door 12 is configured to "roll" or "glide" between the first and second jambs 16, 18 between a closed position (See FIG. 1) and an open position (See FIG. 2). For example, the door 12 may roll or glide between the first and second jambs 14, 16 in a downward direction toward the ground to close and in an upward direction from the ground to open. Stated differently, the door 12 is movable along a longitudinal/vertical length of the first jamb 14 and/or along a longitudinal/vertical length of the second jamb 16. According to various aspects, the door 12 may be opened and closed manually. According to other aspects, the loading dock door system 10 also includes an electric door opener (not shown for purposes of simplicity) which is coupled to the door 12 and operates to automatically open and close the door 12.

Figure 3:
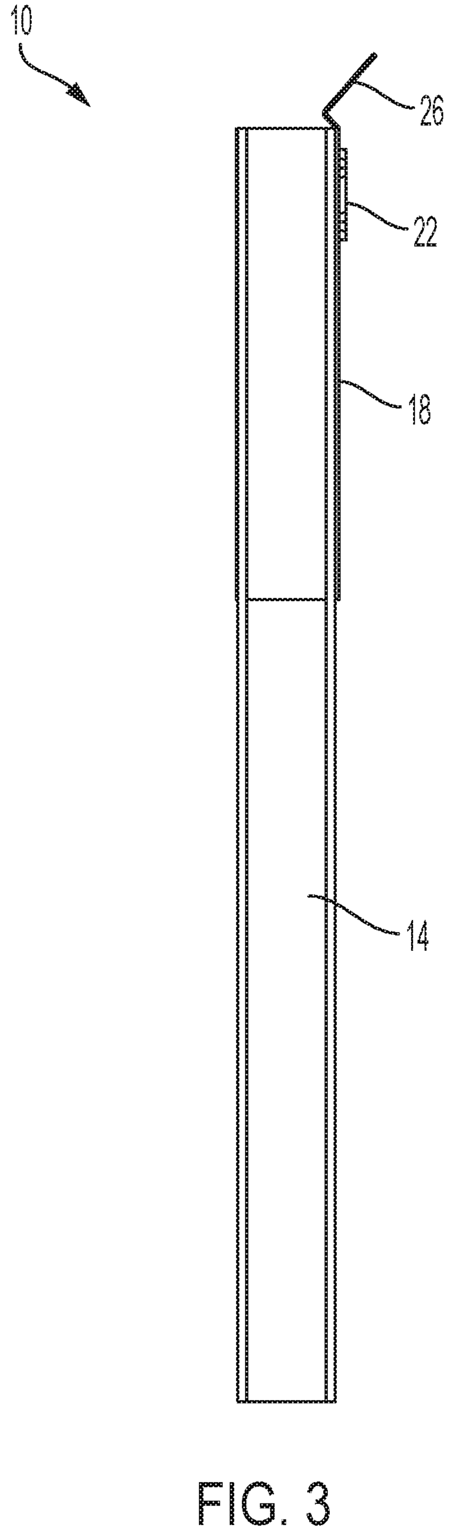
FIG. 3 illustrates a partial side view of the loading dock door system of FIG. 1, in accordance with at least one aspect of the present disclosure.

FIG. 3 illustrates a partial side view of the loading dock door system 10, in accordance with at least one aspect of the present disclosure. The door 12 is hidden from view in FIG. 3. The first jamb 14 extends upward from (or slightly above) a finished surface such as a concrete pad or floor. The first top rail 18 partially surrounds the first jamb 14 and extends upward therefrom. The first door stop 22 is positioned proximate an upper end of the first top rail 18. As shown in FIG. 3, the first top rail 18 defines a first door guide 26 at a top of the first top rail 18. The first jamb 14, the first top rail 18 and the first door stop 22 are described in more detail hereinbelow.

Figure 4:
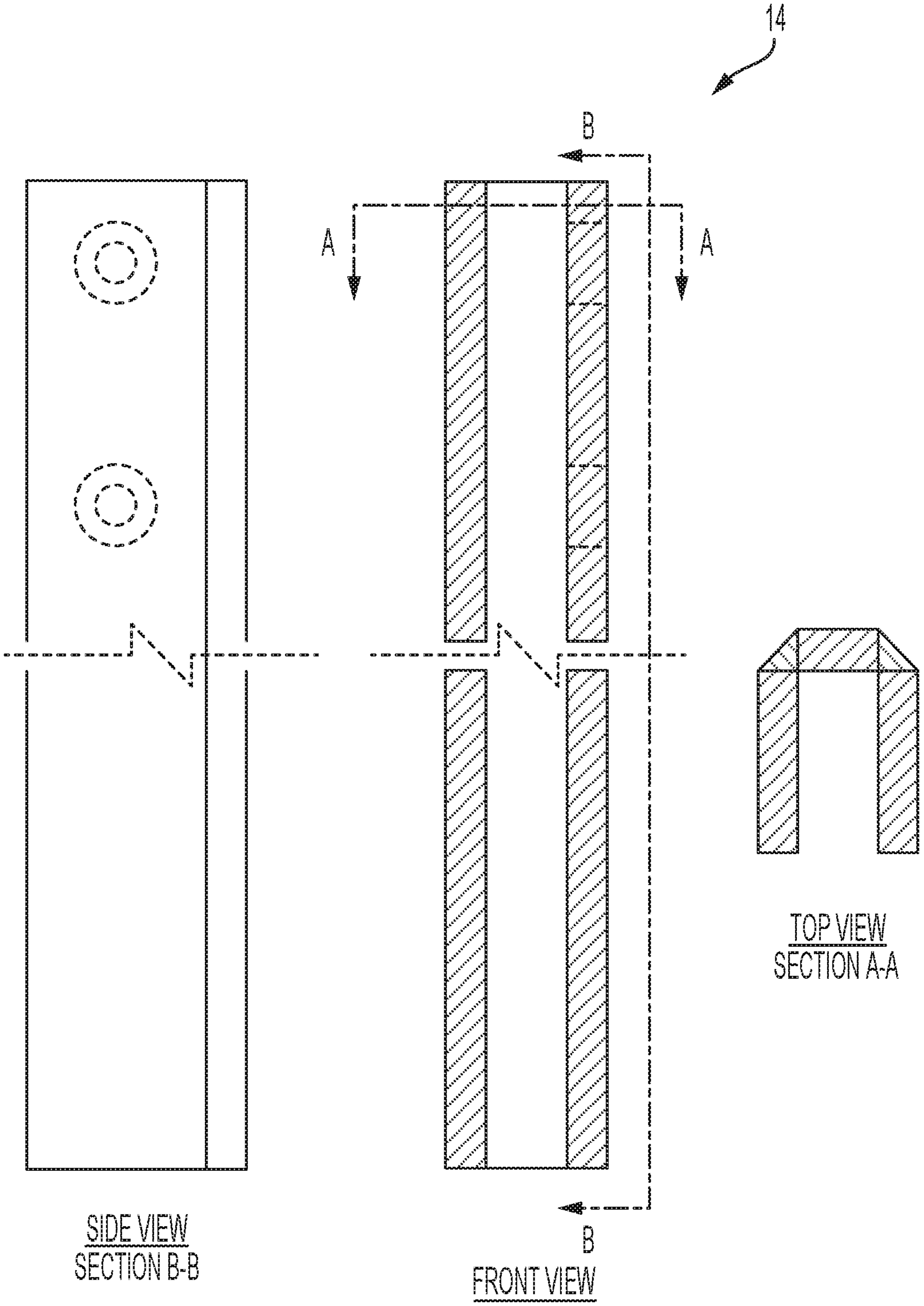
FIG. 4 illustrates a front view of a first jamb of the loading dock door system of FIG. 1, in accordance with at least one aspect of the present disclosure.

FIG. 4 illustrates a front view of the first jamb 14 of the loading dock door system 10, in accordance with at least one aspect of the present disclosure. FIG. 4 also illustrates a side view of a first cross-section (B-B) of the first jamb 14 and a cross-sectional view of the first jamb 14 (looking downward from A-A). According to various aspects, the second jamb 16 is a mirror image of, but is otherwise identical to, the first jamb 14. According to other aspects, the second jamb 16 is identical to the first jamb 14. For a given opening in a building, the first jamb 14 may be positioned against the left side of the opening and secured to the building with suitable removable fasteners such as, for example, screws which are countersunk into the first jamb 14. Similarly, the second jamb 16 may be positioned against the right side of the opening and secured to the building with suitable removable fasteners such as, for example, screws which are countersunk into the second jamb 16. Thus, it will be appreciated the first and second jambs 14, 16 are removably secured to the building. The left side and the right side of the given opening in the building may be defined by concrete block, metal, wood, combinations thereof and the like.

The first and second jamb 14, 16 may be of any suitable configuration to allow the door 12 to "roll" or "glide" between the first and second jambs 14, 16 as the door 12 moves toward the open position or toward the closed position. Each of the first and second jambs 14, 16 may be considered to be configured to receive the door 12. As shown in FIG. 4, according to various aspects, a cross-section (A-A) of the first jamb 14 may be generally U-shaped. A similar cross-section of the second jamb 16 may also be generally U-shaped. The first and second jambs 14, 16 extend upward from (or slightly above) a finished surface such as a concrete pad or floor and experience the overwhelming majority of impact events (e.g., impact events caused from forklifts or the pallets/materials being carried by the forklifts).

In contrast to the "metal" jambs known in the art, the first and second jambs 14, 16 are fabricated from, and thus comprise, a polymer. According to various aspects, the polymer of the first and second jambs 14, 16 is 100% recyclable. According to various aspects, the polymer comprises a high molecular weight polyethylene (HMWPE). For at least one of such aspects, the molecular weight of the HMWPE of the first and second jambs 14, 16 is less than 500,000 g/mol, the density is 0.96 g/cm$^3$, the tensile strength at yield is 28 MPa, the tensile impact is 190 Kj/m$^2$, the elongation at break is 500% and the hardness is 77 Shore D. For other of such aspects, one or more of the above values associated with the HMWPE can vary by 5%, 10% or the like and still allow the first and second jambs 14, 16 to realize the properties/characteristics described below.

According to other aspects, the polymer comprises an ethylene propylene diene monomer (EPDM) rubber. For at least one of such aspects, the density is in the range of 0.90 g/cm$^3$ to 2.00 g/cm$^3$, the tensile failure stress is 17 MPa, the elongation after fracture is greater than or equal to 300% and the hardness is in the range of 40 to 90 Shore A. For other of such aspects, one or more of the above values associated with the EPDM rubber can vary by 5%, 10% or the like and still allow the first and second jambs 14, 16 to realize the properties/characteristics described below.

With the polymer of the first and second jambs 14, 16, the first and second jambs 14, 16 are more resistant to abrasion than "metal" jambs known in the art, provide more resistance to damage than the "metal" jambs known in the art, and thus are expected to require replacement much less often than the "metal" jambs known in the art, thereby providing significant savings in material, labor, downtime and opportunity costs over time. Although the HMWPE and the EPDM rubber examples described above are two examples of the polymer, it will be appreciated the first and second jambs 14, 16 may comprise polymers other than the HMWPE and EPDM rubber examples described, as long as such other polymers still allow the first and second jambs 14, 16 to realize the properties/characteristics (e.g., more resistant to abrasion, provide more resistance to damage, require replacement less often, etc.) described above.

Figure 5:
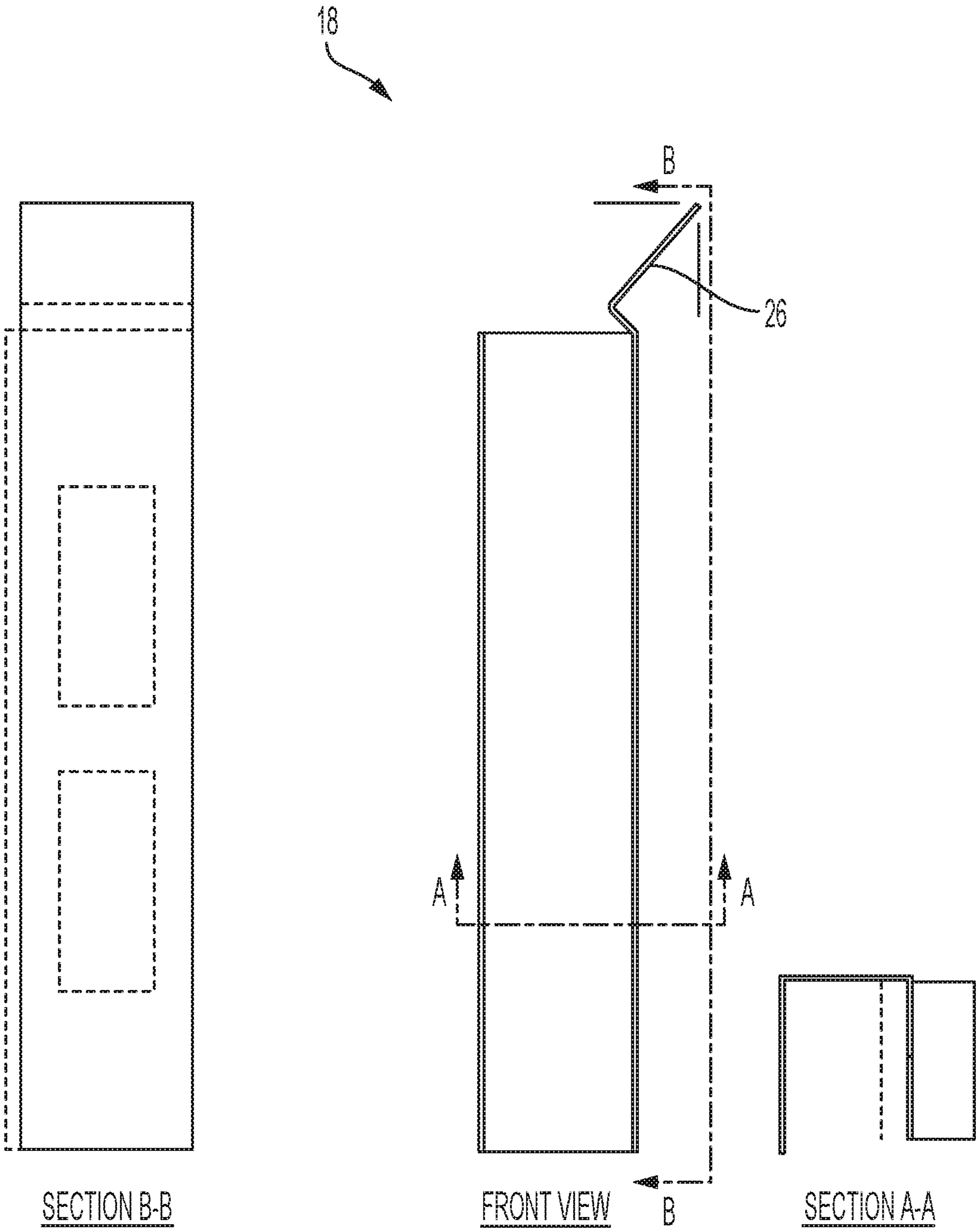
FIG. 5 illustrates a front view of a first top rail of the loading dock door system of FIG. 1, in accordance with at least one aspect of the present disclosure.

FIG. 5 illustrates a front view of the first top rail 18 of the loading dock door system 10, in accordance with at least one aspect of the present disclosure. FIG. 5 also illustrates a side view of a first cross-section (B-B) of the first top rail 18 and a cross-sectional view of the first top rail 18 (looking upward from A-A). According to various aspects, the second top rail 20 is a mirror image of, but is otherwise identical to, the first top rail 18. According to other aspects, the second top rail 20 is identical to the first top rail 18. The first top rail 18 partially surrounds the first jamb 14 and extends upward therefrom. Similarly, the second top rail 20 partially surrounds the second jamb 16 and extends upward therefrom. The first and second top rails 18, 20 may be of any suitable configuration to allow the door 12 to "roll" or "glide" between the first and second top rails 18, 20 (and by extension between the first and second jambs 14, 16) as the door 12 moves toward the open position or toward the closed position. Each of the first and second top rails 18, 20 may be considered to be configured to receive the door 12. As shown in FIG. 5, according to various aspects, a cross-section (A-A) of the first top portion 18 may be generally U-shaped. A similar cross-section of the second top portion 20 may also be generally U-shaped. According to various aspects, the first and second top rails 18, 20 are secured to the building with suitable removable fasteners such as, for example, screws which are countersunk into the second jamb 16. In some aspects, one or more of the removable fasteners which are used to respectively secure the first and second jambs 14, 16 to the building may also be utilized to respectively secure the first and second top rails 18, 20 to the building. Thus, it will be appreciated the first and second top rails 18, 20 are removably secured to building and/or to the first and second jambs 14, 16.

As shown in FIG. 5, the first top rail 18 defines a first door guide 26 at a top of the first top rail 18. Similarly, the second top rail 20 defines a second door guide 28 at a top of the second top rail 20. The first door guide 26 is oriented at an angle relative to the longitudinal/vertical length of the first top rail 18 and the second door guide 28 is oriented at an angle relative to the longitudinal/vertical length of the second top rail 20. The first and second door guides 26, 28 operate to guide the door 12 into the proper position between the first and second top rails 18, 20 (and by extension between the first and second jambs 14, 16) as the door 12 moves from a fully open position towards the closed position. The first and second top rails 18, 20 may be fabricated from any suitable material. For example, according to various aspects, the first and second top rails 18, 20 are fabricated from a galvanized metal such as a galvanized steel or a galvanized iron.

Figure 6:
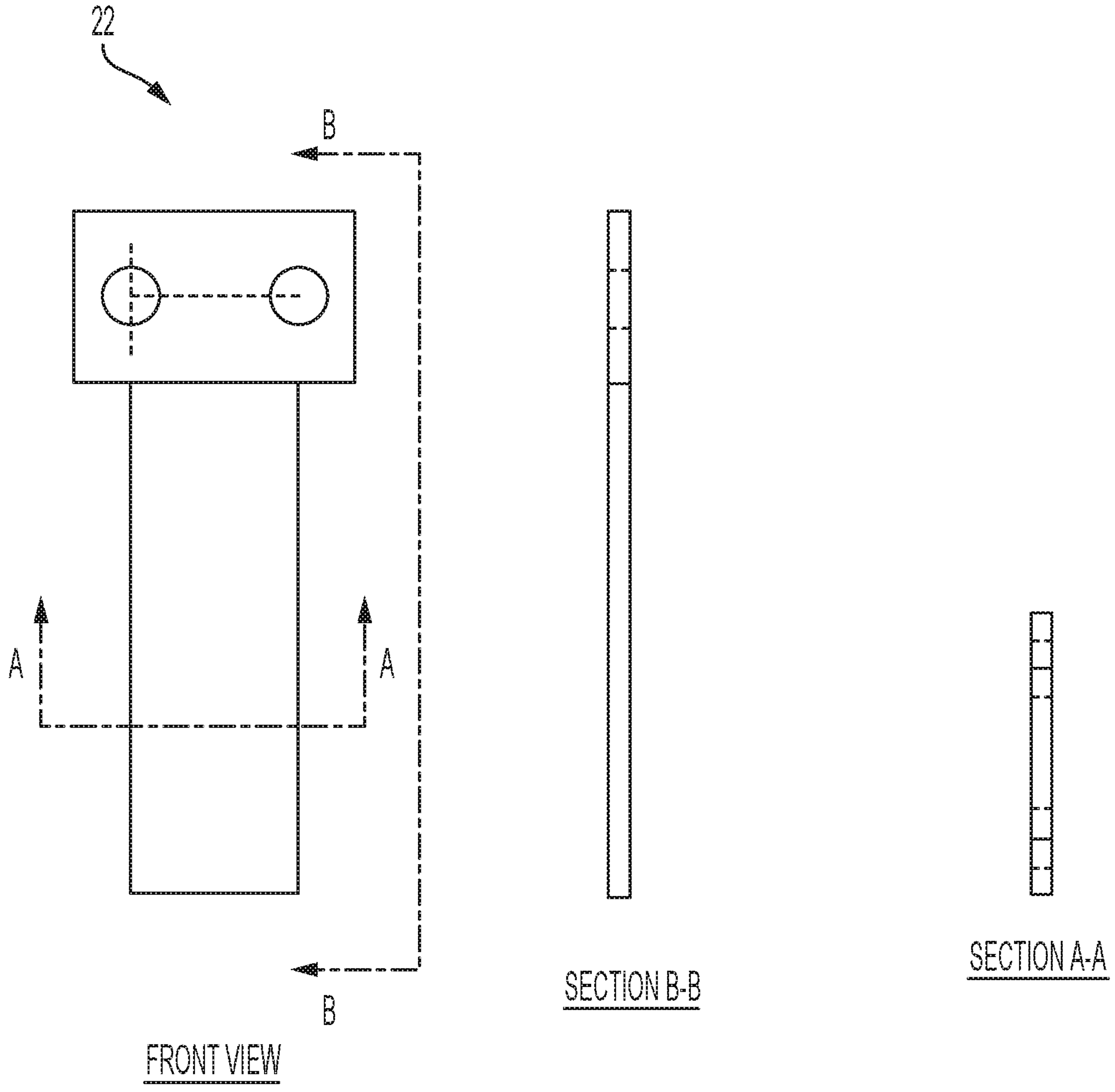
FIG. 6 illustrates a front view of a first door stop of the loading dock door system of FIG. 1, in accordance with at least one aspect of the present disclosure.

FIG. 6 illustrates a front view of the first door stop 22 of the loading dock door system 10, in accordance with at least one aspect of the present disclosure. FIG. 6 also illustrates a first cross-sectional view (along B-B) of the first door stop 22 and a second cross-sectional view (looking upward from A-A) of the first door stop 22. According to various aspects, the second door stop 24 is a mirror image of, but is otherwise identical to, the first door stop 22. According to other aspects, the second door stop 24 is identical to the first door stop 22. The first door stop 22 is removably secured to the first top rail 18 and extends transversely toward the second top rail 20. Similarly, the second door stop 24 is removably secured to the second top rail 20 and extends transversely toward the first top rail 20. The first and second door stops 22, 24 may be removably secured to the first and second top rails 18, 20 respectively in any suitable manner. For example, according to various aspects, the first and second door stops 22, 24 are removably secured to the first and second top rails 18, 20 respectively with fasteners such as screws or nuts and bolts.

The first and second door stops 22, 24 operate to limit how far the door 12 can be opened or raised during normal operation. Of course, in certain instances, by removing the first and second door stops 22, 24 from the first and second top rails 18, 20, the door 12 can opened to a position above the first and second door stops 22, 24 and/or above the first and second top rails 18, 20. The first and second door stops 22. 24 may be fabricated from any suitable material. For example, according to various aspects, the first and second door stops 22, 24 are fabricated from a metal such as a steel.

EXAMPLES

Example 1—A jamb is provided. The jamb comprises a polymer and is configured to receive a loading dock door.

Example 2—The jamb of Example 1, wherein the polymer is a recyclable polymer.

Example 3—The jamb of Examples 1 or 2, wherein the polymer comprises a high molecular weight polyethylene.

Example 4—The jamb of Examples 1 or 2, wherein the polymer comprises an ethylene propylene diene monomer rubber.

Example 5—The jamb of Examples 1, 2, 3 or 4, wherein the jamb has a u-shaped cross-section.

Example 6—A loading dock door system is provided. The loading dock door system comprises a first jamb, a second jamb positioned opposite the first jamb, a first top rail partially surrounding the first jamb, a second top rail partially surrounding the second jamb, a first door stop removably connected to the first top rail and a second door stop removably connected to the second top rail. At least one of the first and second jambs comprises a polymer and is configured to receive a loading dock door.

Example 7—The loading dock door system of Example 6, wherein the polymer is a recyclable polymer.

Example 8—The loading dock door system of Examples 6 or 7, wherein the polymer comprises a high molecular weight polyethylene.

Example 9—The loading dock door system of Example 6, wherein the polymer comprises an ethylene propylene diene monomer rubber.

Example 10—The loading dock door system of Examples 6, 7, 8 or 9, wherein at least one of the first and second jambs has a u-shaped cross-section.

Example 11—The loading dock door system of Examples 6, 7, 8, 9 or 10, wherein at least one of the first and second top rails comprises a galvanized metal.

Example 12—The loading dock door system of Examples 6, 7, 8, 9, 10 or 11, wherein at least one of the first and second top rails has a u-shaped cross-section.

Example 13—The loading dock door system of Examples 6, 7, 8, 9, 10, 11 or 12, wherein the first top rail extends above the first jamb.

Example 14—The loading dock door system of Examples 6, 7, 8, 9, 10, 11, 12 or 13, wherein the first top rail defines a first door guide.

Example 15—The loading dock door system of Example 14, wherein the first door guide is oriented at an angle relative to a longitudinal length of the first top rail.

Example 16—The loading dock door system of Examples 6, 7, 8, 9, 10, 11, 12, 13, 14 or 15, wherein the second top rail extends above the second jamb and defines a second door guide.

Example 17—The loading dock door system of Example 16, wherein the second door guide is oriented at an angle relative to a longitudinal length of the second top rail.

Example 18—The loading dock door system of Examples 6, 7, 8, 9, 10, 11, 12, 13, 14, 15, 16 or 17, wherein at least one of the first and second door stops comprises a metal.

Example 19—The loading dock door system of Examples 6, 7, 8, 9, 10, 11, 12, 13, 14, 15, 16, 17 or 18, wherein the first door stop extends transversely from the first top rail toward the second top rail, and the second door stop extends transversely from the second top rail toward the first top rail.

Example 20—The loading dock door system of Examples 6, 7, 8, 9, 10, 11, 12, 13, 14, 15, 16, 17, 18 or 19, further comprising the loading dock door, wherein the loading dock door is positioned between the first and second jambs and is movable along a longitudinal length of the first jamb.

Although the various aspects of the jamb and the loading dock door system have been described herein in connection with certain disclosed aspects, many modifications and variations to those aspects may be implemented. Also, where materials are disclosed for certain components, other materials may be used in certain instances. Furthermore, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A loading dock door system, comprising:

a first jamb constructed from a polymer;

a second jamb positioned opposite the first jamb, wherein the first and second jambs are configured to receive a loading dock door, and wherein the first and second door jambs comprise a U-shaped cross-section;

a first top rail partially surrounding the first jamb;

a second top rail partially surrounding the second jamb;

a first door stop removably connected to the first top rail; and a second door stop removably connected to the second top rail, wherein the first and second door stop can be removed and repositioned on the first and second top rails to limit how far a door can be opened or closed during operation.

2. The loading dock door system of claim 1, wherein the polymer comprises a recyclable polymer.

3. The loading dock door system of claim 1, wherein the polymer comprises a high molecular weight polyethylene.

4. The loading dock door system of claim 1, wherein the polymer comprises an ethylene propylene diene monomer rubber.

5. The loading dock door system of claim 1, wherein at least one of the first and second top rails comprises a galvanized metal.

6. The loading dock door system of claim 1, wherein at least one of the first and second top rails has a u-shaped cross-section.

7. The loading dock door system of claim 1, wherein the first top rail extends above the first jamb.

8. The loading dock door system of claim 1, wherein the first top rail defines a first door guide.

9. The loading dock door system of claim 8, wherein the first door guide is oriented at an angle relative to a longitudinal length of the first top rail.

10. The loading dock door system of claim 1, wherein the second top rail extends above the second jamb and defines a second door guide.

11. The loading dock door system of claim 10, wherein the second door guide is oriented at an angle relative to a longitudinal length of the second top rail.

12. The loading dock door system of claim 1, wherein at least one of the first and second door stops comprises a metal.

13. The loading dock door system of claim 1, wherein:

the first door stop extends transversely from the first top rail toward the second top rail; and the second door stop extends transversely from the second top rail toward the first top rail.

14. The loading dock door system of claim 1, further comprising the loading dock door, wherein the loading dock door is positioned between the first and second jambs and is movable along a longitudinal length of the first jamb.

15. The loading dock door system of claim 1, wherein the first top rail comprises a first door guide, wherein the second top rail comprises a second door guide, and wherein the first and second door guides are configured to guide a door into the proper position between the first and second top rails as the door moves from a fully open position towards the closed position.

16. The loading dock door system of claim 15, wherein the first door guide is oriented at an angle relative to a vertical length of the first top rail, and wherein the second door guide is oriented at an angle relative to a vertical length of the second top rail.

17. The loading dock door system of claim 1, wherein the second door jamb is constructed from a second polymer.

18. The loading dock door system of claim 17, wherein the polymer is the same as the second polymer.

19. The loading dock door system of claim 1, wherein the first and second door jamb comprise a density greater than or equal to 0.90 $g/cm^3$ and less than or equal to 2.00 $g/cm^3$.

20. The loading dock door system of claim 19, wherein the first and second door jamb comprise a the tensile failure stress is 17 MPa.

21. The loading dock door system of claim 20, wherein the first and second door jamb comprise an elongation after fracture is greater than or equal to 300%.

22. The loading dock door system of claim 21, wherein the first and second door jamb comprise a hardness greater than or equal to 40 and less than or equal to 90 Shore A.

* * * * *